United States Patent

Barmasse

[15] 3,688,878
[45] Sept. 5, 1972

[54] MULTIPLE DISK FAILSAFE BRAKE FOR ROTARY HYDRAULIC MOTORS

[72] Inventor: Edmund E. Barmasse, Depew, N.Y.

[73] Assignee: Houdaille Industries Inc., Buffalo, N.Y.

[22] Filed: April 10, 1970

[21] Appl. No.: 27,301

[52] U.S. Cl. ........................... 188/170, 188/206 R
[51] Int. Cl. ....................................... F16d 65/24
[58] Field of Search..... 188/72.3, 170, 251 M, 206 R; 192/3 R; 254/186 R

[56] References Cited

UNITED STATES PATENTS

| | | | |
|---|---|---|---|
| 2,584,191 | 2/1952 | Danly et al. | 188/170 |
| 2,584,192 | 2/1952 | Danly et al. | 188/170 |
| 3,082,647 | 3/1963 | Banker | 188/170 X |
| 3,441,110 | 4/1969 | Ruggen | 188/170 |
| 3,500,970 | 3/1970 | Schilling | 188/170 |
| 3,559,772 | 2/1971 | Grombka | 188/170 |
| 2,698,676 | 1/1955 | Eason | 188/170 |
| 3,191,734 | 6/1965 | Batchelor et al. | 188/251 M X |
| 3,244,405 | 4/1966 | Hanning | 188/170 X |

FOREIGN PATENTS OR APPLICATIONS

| 934,142 | 8/1963 | Great Britain | 188/170 |
|---|---|---|---|

*Primary Examiner*—Duane A. Reger
*Attorney*—Hill, Sherman, Meroni, Gross & Simpson

[57] ABSTRACT

A multiple disk failsafe brake for rotary hydraulic motors has stator brake disks interleaved with rotor brake disks normally frictionally interlocked by a spring biased piston which is releasable by the hydraulic pressure which drives its associated motor. The brake rotor is corotatively coupled with the motor shaft and may provide an extension of such shaft. Versatile mounting of the brake relative to the motor is provided for.

15 Claims, 7 Drawing Figures

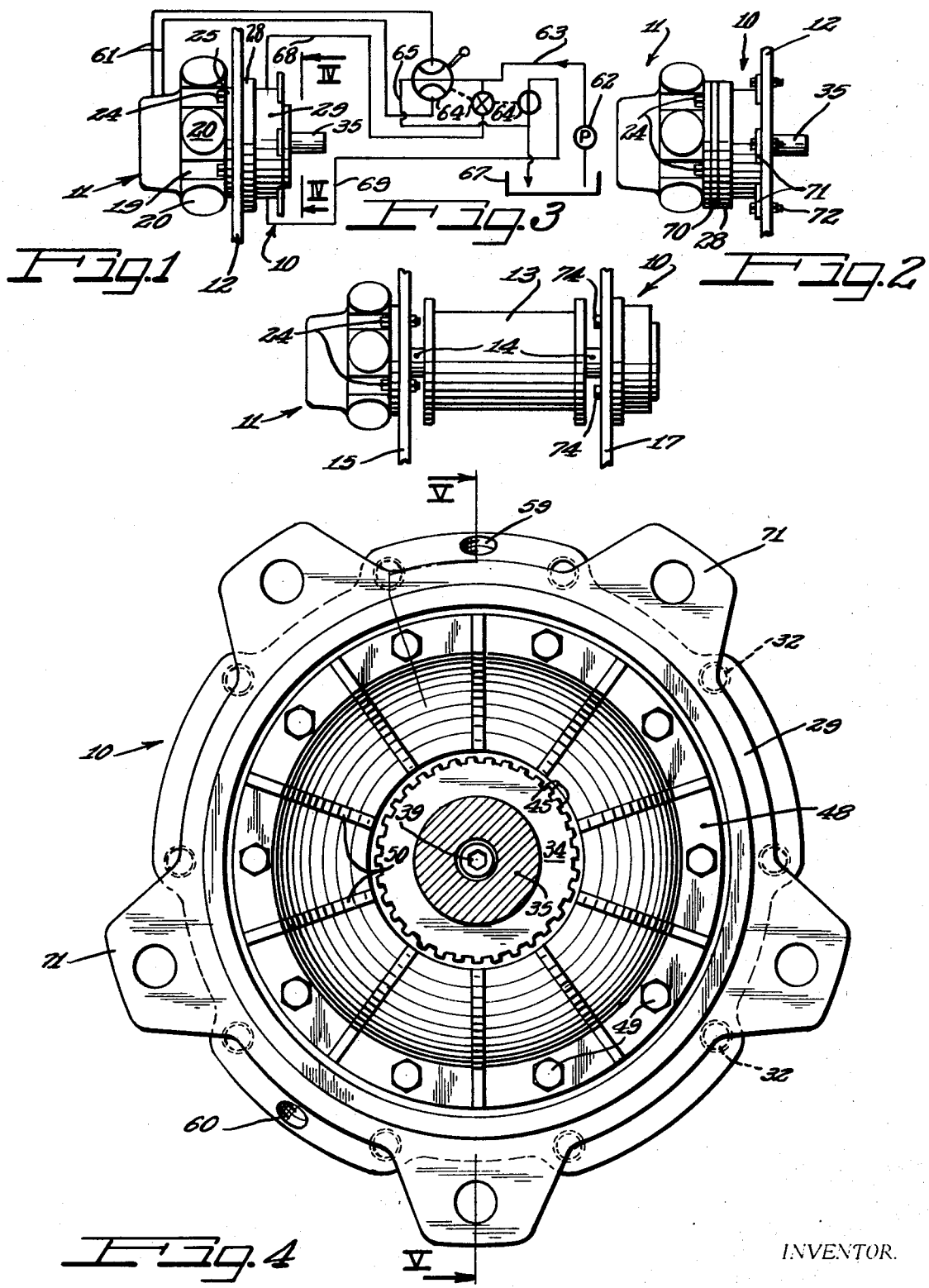

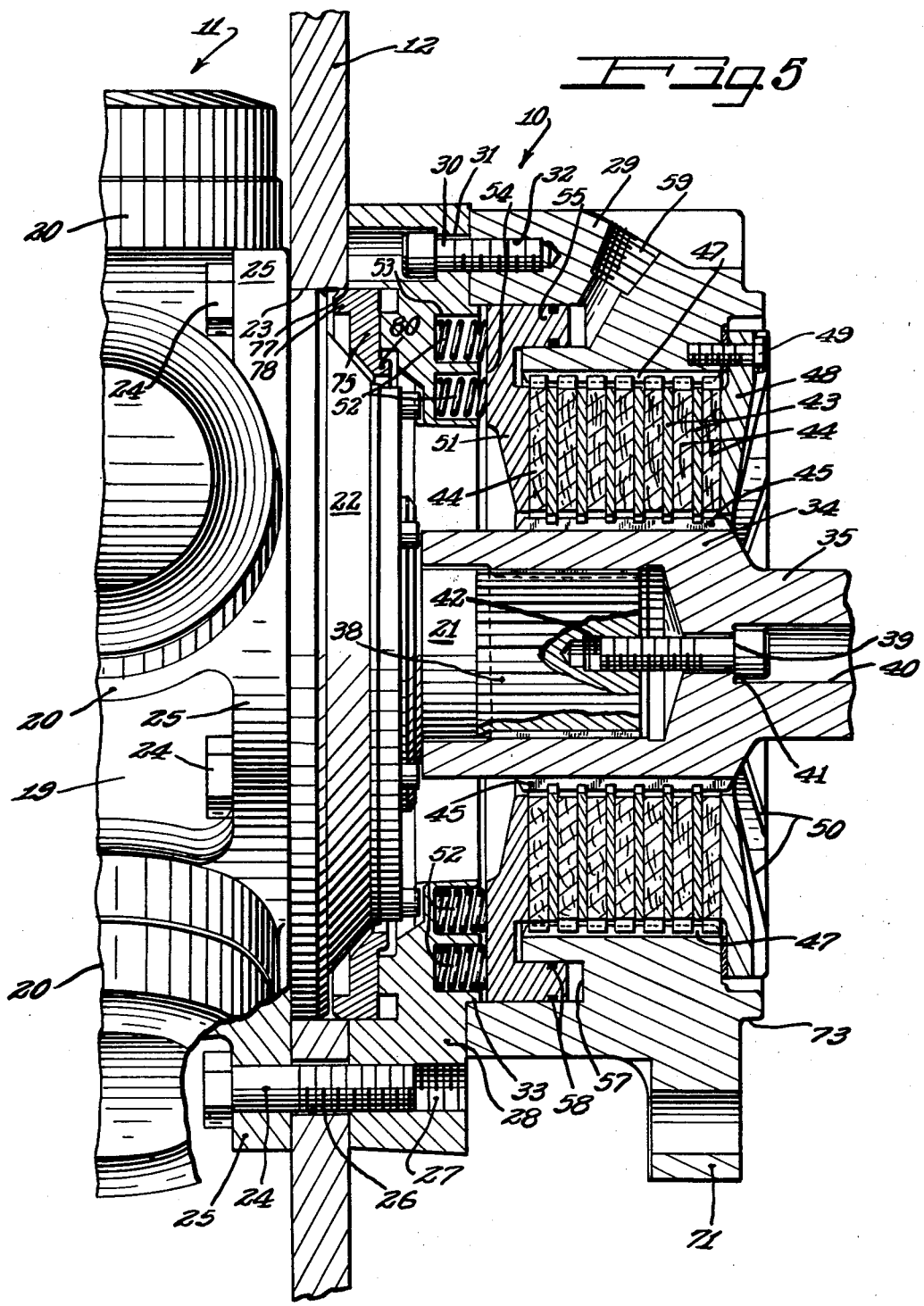

INVENTOR.
Edmund E. Barmasse

MULTIPLE DISK FAILSAFE BRAKE FOR ROTARY HYDRAULIC MOTORS

This invention relates to multiple disk failsafe brakes for rotary hydraulic motors and is more particularly concerned with heavy-duty brakes of this character.

Numerous varied brake arrangements have been proposed for rotary motors but have most generally required special structures involving either or both of the motor housing and shaft. In other words, prior brakes have generally been constructed as part of the motor unit. This is a disadvantage where the motor unit may have various uses in some of which no brake may be needed. An example of such a motor, and more particularly a hydraulically operated motor, which is adapted to be constructed in standard size units adapted for various uses is the high torque, low speed radial piston motor exemplified in U.S. Pat. No. 3,036,557. Such a motor is capable of being run in either rotary direction and has a high torque capability in a relatively small compact unit.

Generally, in hydraulically operated brakes it has been necessary to provide a pressure reduction in the supply line where high hydraulic pressures have been utilized in operating the associated equipment, and more particularly in motors with which the brake is associated.

Another difficulty experienced with prior constructions has been the inability to change worn components without disconnecting hydraulic lines and removing substantial parts of the assembly.

By the present invention hydraulic motors are adapted to be equipped with brakes without requiring alterations in the motor housing or shaft structure, and more especially brakes which will overcome the foregoing and other disadvantages, shortcomings, difficulties, inefficiencies and problems.

An important object of the present invention is to provide a new and improved failsafe brake for hydraulic motors.

Another object of the invention is to provide a new and improved mechanical brake for hydraulic motors which is adapted to be released by hydraulic pressure.

Another object of the invention is to provide a new and improved brake for rotary devices and in which an unusually efficient spring biased brake setting arrangement is provided.

Still another object of the invention is to provide new and improved means for coupling a failsafe brake with a rotary motor.

Yet another object of the invention is to provide new and improved means for mounting a failsafe brake in respect to a rotary motor.

A still further object of the invention is to provide a new and improved heavy-duty failsafe brake for high torque, low speed hydraulic motors.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a side elevational view of a motor and brake assembly embodying features of the invention;

FIG. 2 is a side elevational view showing a different arrangement of the motor and brake assembly;

FIG. 3 is a side elevational view showing still another arrangement of the motor and brake assembly;

FIG. 4 is an enlarged end elevational view, partially in section, of the brake device taken substantially along the line IV—IV of FIG. 1;

FIG. 5 is an enlarged longitudinal sectional detail view taken substantially along the line V—V of FIG. 4;

Figure 6:
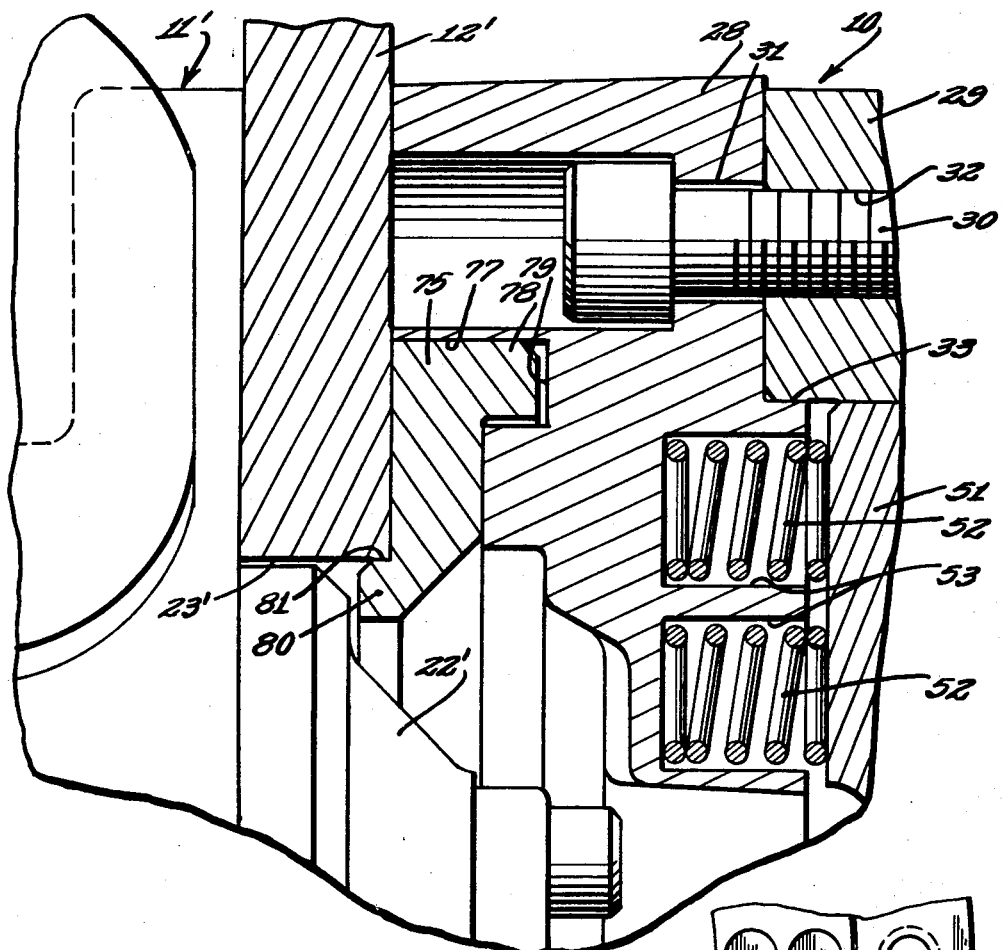
FIG. 6 is an enlarged fragmentary vertical longitudinal sectional detail view showing a modified mounting of the brake to accommodate a smaller size motor.

Having reference to FIGS. 1, 2 and 3, a brake unit 10 embodying features of the invention is depicted in various practical associated arrangements with a rotary hydraulic motor 11. Although the motor 11 may be standardized in construction for various uses, and at least some of which it may not be required to be associated with a brake, in the present instance the motor and the brake provide a so-called package assembly, in which the motor retains its unaltered identity and the brake is particularly devised to be operatively associated with the motor in a variety of practical relationships. For example, in FIGS. 1 and 2 the brake and motor arrangement is especially suitable for operating moving parts in various earth moving machines, cranes, hoists and the like in which the motor is capable of moving heavy or heavily loaded members. For this purpose, the motor and brake assembly may be mounted on a bulkhead 12. In FIG. 1 the motor 11 is located at one side of the bulkhead and the brake 10 at the opposite side of the bulkhead. In FIG. 2 the motor 11 is mounted piggyback on the brake 10 which is in turn mounted on the bulkhead 12. In FIG. 3 the motor 11 is mounted to drive a cable drum 13 mounted on a shaft 14 journalled on and between supporting frame members 15 and 17 on one of which the motor 11 is mounted for driving the drum shaft 14 while the brake 10 is mounted on the other of the frame members and operatively coupled to the drum shaft. In any of these, or other applications of the motor and brake assembly, the brake 10 is adapted to hold the motor or motor driven shaft against rotation selectively and positively in the operating cycle or otherwise of the associated apparatus. The brake is especially useful in holding the associated shaft positive against rotation when hydraulic pressure is turned off or the hydraulic system is shut down or there is a hydraulic system failure.

In accordance with the general features of rotary hydraulic motors of the kind disclosed in U.S. Pat. No. 3,036,557, the motor 11 comprises a casing or housing 19 provided with a plurality such as five cylinders 20 projecting radially in circumferentially equally spaced relation from the perimeter of the casing and housing radially reciprocable respective pistons coordinated in operation to drive a shaft having a stub portion 21 (FIG. 5) extending from one portion 22 of the motor housing and adapted to project through an opening 23 in the supporting member such as the bulkhead 12. Mounted attachment of the motor on the bulkhead 12 is effected by means comprising bolts 24 extending through respective attachment flange ears 25 on the motor housing located to be accessible between the cylinders 20.

Where, as shown in FIGS. 1 and 5, the motor 11 is mounted on one side of the bulkhead 12 with the brake assembly on the other side and with the bulkhead panel clamped therebetween, attachment of the motor and the brake is adapted to be effected by means of the bolts 24 which for this purpose have their shanks extending through clearance holes 26 in the supporting panel or bulkhead 12 and threadedly engaged in tapped screw holes 27 in a brake base plate 28 (FIGS. 5 and 6). Attachment of the base plate 28 to a brake housing 29 is effected by means comprising screws 30 extending through holes 31 from the back of the base plate and threaded into tapped bores 32 in the base end of the housing. Concentricity of the base plate 28 and the housing 29 is maintained by an annular rabbet shoulder 33 on the base plate against which the housing seats.

Mechanical braking is provided for within the brake housing 29 normally acting to hold the motor shaft and any apparatus part or connection with which the motor shaft is operatively associated normally stationary but releasable relative to and with respect to the motor housing and the brake housing, and more particularly relative to and with respect to the supporting frame structure represented by the bulkhead 12. To this end, the brake housing 29 serves as a stator and is desirably in the form of an annulus of substantially greater inside diameter than the motor shaft stub extension 21 to receive a coupling head 34 serving as a rotor on the inner end portion of a shaft extension 35 through which working rotary motion generated by the motor 11 is to be transmitted to the apparatus with which the motor and brake assembly is to be used. For corotational connection with the stub shaft 21, the rotor head 34 has an internally splined socket 37 within which is received an externally splined terminal portion 38 of the shaft stub. Retaining means for securing the rotor head and shaft extension against axial displacement from the terminal portion 38 may comprise a bolt 39 accessible through a tapped axial bore 40 in the shaft extension and having its head driven against a shoulder 41, with its shank threaded into a tapped axially outwardly opening bore 42 in the outer end of the terminal portion. Releasable frictional brake coupling between the stator housing 29 and the relatively rotatable head 34 is provided by a multiple brake disk stack comprising interleaved metallic, such as annular steel, disks 43 and annular friction disks 44. The disks 43 are splined on their inner perimeters and thereby corotatively coupled with the head 34 through axially extending external splines 45 thereon, while the friction disks 44 are splined on their outer perimeters and thereby non-rotatively coupled with the housing 29 through axially extending internal splines 47 thereon.

Means carried by the brake housing 29 normally thrust the interleaved brake disks 43 and 44 frictionally together for thus holding the shaft extension head 34 stationary with respect to the brake housing. For this purpose, the outer end of the housing 29 carries a thrust shoulder portion 48 which confronts the friction disk 44 which is at the outer end of the stack. In this instance the thrust shoulder portion 48 is desirably in the form of a plate which is secured in place on the end of the housing 29 by means such as screws 49 (FIGS. 4 and 5) whereby the plate is adapted to be removed when it is desired to replace the stack of disks or any of them after they become worn, and without requiring dismantling of any other part of the brake assembly. Reinforcing and cooling fins 50 are desirably provided on the outer face of the thrust shoulder plate 48.

Figure 7:
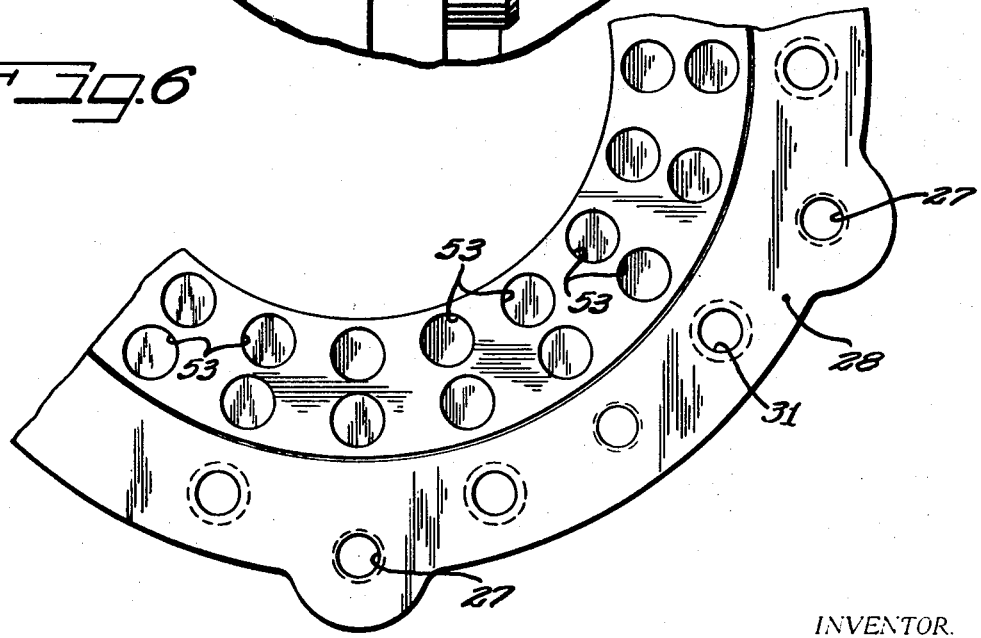
FIG. 7 is a fragmentary end elevational view of the base plate ring of the brake.

Brake setting thrust is applied to the brake disk stack by means comprising an annular pressure disk plate 51 which engages the inner most of the friction disks 44. Brake setting pressure loading of the plate 51 is effected by biasing means comprising a large number of uniformly spaced and substantially uniformly acting short, stiff, relatively small diameter coiled compression springs 52 seated in respective wells 53 recessed in the face of the base plate 28 which confronts an annular shoulder portion 54 of the pressure plate. Normally the shoulder portion 54 is narrowly spaced from the base plate 28, and the spring-seating wells 53 are of shallower depth than the length of the springs 52 so that the springs thrust outwardly from the wells and against the shoulder portion 54 to drive the pressure plate into brake setting thrusting relation against the brake disk stack. As best seen in FIG. 7, the spring-seating wells 53 are disposed in radially aligned pairs and with the pairs of wells equidistantly spaced circumferentially to provide two concentric circular series of the wells. In a typical brake structure each of the spring wells may be on the order of one inch in diameter to receive a spring of close to that diameter, and with twenty of the wells in each circular series. Thereby, a powerful substantially uniform thrust bias is imparted by the springs 52 against the pressure plate 51 to set the brake.

Means are provided for automatically releasing the brake 10 when the motor 11 is hydraulically actuated. For this purpose, the pressure plate 51 is arranged to be hydraulically moved in opposition to its brake-setting spring bias. In a simple and effective construction, to this end, the pressure plate has on the thrust shoulder portion 54 thereof an annular outwardly axially extending piston flange extension 55 projecting in the direction of thrust of the disk plate 51 toward the disk stack and spaced radially outwardly in surrounding relation to the disk stack and engaged within a complementary rearwardly opening annular axially extending cylinder groove 57 in the housing 29, with dynamic sealing rings 58 carried by the piston extension. For hydraulic communication with the cylinder groove 57 between the root of the groove and the distal end of the flange extension 55 which provides a pressure-receiving annular surface facing toward the groove root, respective spaced fluid pressure supply ports 59 and 60 are provided in the housing (FIGS. 4 and 5).

A representative integrated hydraulic circuit operative to control the motor 11, as well as the brake 10 in coordinated relation is depicted schematically in FIG. 1, enabling the motor to be driven rotatably in either rotary direction, and the brake to be released by hydraulic pressure coincident with operation of the motor and automatically resuming brake set condition when the motor is stopped. To this end, respective hydraulic pressure lines 61 are connected with the motor 11 to operate it for driving in either selected rotary direction by means of hydraulic pressure liquid pressurized by a pump 62 in a hydraulic supply line 63 and controlled by a three-way valve 64 which may be manually or automatically operated, depending upon the particular installation. The valve 64 is adapted to be operated to connect either of the lines 61 in pressure supply communication with the supply lines 63 while simultaneously connecting the other of the lines 61 to a return line 65 which dumps into a reservoir or sump 67 from which the fluid is recirculated by the pump 62. During non-operating intervals, the valve 64 connects the pressure supply line 63 with the return line 65. When the valve 64 effects pressure fluid connection of either of the lines 61 with the pressure supply line 63, the valve also effects connection of the pressure supply line 63 with a pressure delivery conduit or duct 68 which communicates with the cylinder 57 through either of the ports 59 or 60, in this instance shown as connecting with the port 59. During hold or non-operating setting of the valve 64, it disconnects the duct 68 from the supply line 63 and opens the cylinder 57 to drain by way of a dumping or drain duct 69 leading from the port 60 through the valve to the return or drain line 65. Through this arrangement, operation of the brake 10 is coordinated with operation of the motor 11 and the brake remains set when the motor is shut off preventing drift or unintended turning or rotation of the associated apparatus. Simultaneously with running of the motor, release of the brake is effected by the hydraulic line pressure which overcomes the biasing springs 52 and forces the pressure plate 51 to a brake releasing backed off position wherein the shoulder 54 may be backed against the base plate 28, the springs 52 being guarded against undue compression by retraction into the wells 53. Through the described hydraulic operating and control arrangement operation of the brake at line pressure is enabled without any need for pressure reduction. Coordinated operation of the motor and the brake is adapted to be effected similarly in the arrangements of FIGS. 2 and 3.

Having regard to FIG. 2, where requirements of installation are such as to preclude or at least render inconvenient mounting of the brake 10 and the motor 11 on opposite sides of and with the bulkhead panel 12 clamped therebetween, the motor 11 may be mounted piggyback in alignment with and on the brake 10 and the brake mounted on the selected side of the bulkhead 12. For this purpose, an adaptor plate 70 of about the same thickness as the bulkhead 12 is clamped between the adjacent ends of the motor housing and the base plate 28 of the brake assembly, with the bolts 24 securing the brake and the motor fixedly together, and maintaining the relationship otherwise the same as shown in FIG. 5. In this instance, the brake housing 29 is secured on its outer end to the bulkhead 12, being provided for this purpose with means comprising a plurality of circumferentially spaced integral attachment ears 71 which are adapted to be secured by means of bolts 72 fixedly against the bulkhead. For this purpose, also, the outer end of the housing 29 is desirably provided with an annular centering projection 73 (FIG. 5) adapted to cooperate with the edge defining an opening in the bulkhead 12 similar to the opening 23. Through this arrangement the adaptor shaft extension 35 extends beyond the opposite side of the bulkhead 12 for attachment to the apparatus to be motivated by the motor.

While the winch or hoist drum 13 of FIG. 3 may be driven by a piggyback arrangement similar to FIG. 2, a more balanced torque load arrangement is depicted in FIG. 3 wherein the motor 11 is attached directly to the supporting member 15 by means of the bolts 24 and has its shaft coupled directly to one end portion of the drum shaft 14. At its opposite end portion the drum shaft 14 is coupled directly with the rotor of the brake 10 which has its stator housing secured to the supporting member 17 as by means of bolts 74.

Means are desirably provided for maintaining the brake 10 and the motor 11 concentric with respect to each other and to the bulkhead 12, herein comprising a centering ring 75 (FIG. 5) having an outer diameter fitting closely slidably within a cylindrical centering surface 77 at the back of the base member 28. In a preferred arrangement, the diameter of this centering surface is the same as the diameter of the opening 23 in the bulkhead 12 which accommodates the front end structure 22 of the motor 11 of maximum size for which the brake 10 is adapted. Thereby, a centering flange extension 78 on the ring 75 having its outer diameter concentric with the outer diameter of the ring is adapted to engage the cylindrical surface defining the opening 23, thus holding the base member 28 positively concentric with the opening 23 and against radial displacement relative thereto.

To adapt the centering ring for accommodating a situation in which a smaller size rotary hydraulic motor 11' (FIG. 6) is associated with the brake 10, all other conditions of relationship of brake to motor and operation being the same as already described, but a smaller clearance aperture 23' being provided in the bulkhead 12' for accommodating the smaller front end structure 22' of the motor, the ring is constructed to be reversible. For this purpose, the base member 28 has in alignment with the centering surface 77 a groove 79 providing clearance into which the extension flange 78 is freely received while the reversed ring continues to make centering engagement with the surface 77. For engagement with the edge defining the smaller size clearance hole 23', the ring 75 has on its inner margin a centering flange extension 80 provided with a centering surface 81 which slidably closely engages the edge defining the clearance opening.

As may be noted in FIGS. 4 and 5, a slight clearance is provided between the inner edge of the thrust shoulder plate 48 and the rotor 34. Thereby, the rotor 34 and the shaft extension are adapted to be inserted into coupled relation with the shaft stub 21 or removed without otherwise dismantling the brake unit 10.

It may also be noted that when the thrust plate 48 is removed for access to the stack of brake disks 43 and 44, the pressure plate 51 will be held to a limited range of outward displacement under thrust of the springs 52 by the confronting portion of the housing 29 serving as a stop. The total length of the stack of brake disks is great enough to normally maintain the pressure plate 51 backed sufficiently away from the stop surface of the housing 29 to avoid interference therefrom during brake-setting pressure applied by the plate 51.

It will be understood that variations and modifications may be effected without departing from the spirit and scope of the novel concepts of this invention.

I claim as my invention:

1. In a self-contained failsafe brake unit especially adapted for association with a heavy-duty motor which is operative to drive a shaft rotatably:

a rotor having means for corotatively connecting it with said shaft;

a stator having means for mounting it in a stationary position concentric with said rotor;

a stack of interleaved frictionally confronting annular brake disks certain of which are coupled corotatively to said rotor and alternate ones of the disks being coupled non-rotatively to said stator;

means normally biasing said disks into brake-setting frictional gripping engagement with one another to hold the rotor and shaft non-rotatable with the stator;

means for releasing said biasing means from its brake-setting relation to said disks to enable rotation of said rotor with said shaft by operation of the motor; and an annular thrust shoulder element on an end of said stator and against which said stack of disks is biased in the brake-setting condition;

said rotor being separably mounted on the shaft and extending freely through an opening in said shoulder element for selective removal from the stator, and having means for attachment to apparatus to be thereby driven by power generated by said motor to drive said shaft and rotor.

2. In a unit according to claim 1, said annular element being removable relative to said stator and said rotor without disturbing the rotor for replacing said stack of disks without otherwise dismantling the unit.

3. In a self-contained failsafe brake unit especially adapted for association with a heavy-duty motor which is operative to drive a shaft rotatably:

a rotor having means for corotatively connecting it with said shaft;

a stator having means for mounting it in a stationary position concentric with said rotor;

friction disk means in part corotative with said rotor and in part non-rotative with said stator;

means normally biasing said disk means into brake-setting frictional gripping engagement to hold the rotor and shaft non-rotatable with the stator and including a disk thrusting normally toward the disk means;

said disk having an axially extending annular piston flange thereon projecting in the direction of thrust toward said disk means and spaced radially outwardly in surrounding relation to said disk means; and said stator having an annular axially extending cylinder groove complementary to and into which said piston flange extends axially reciprocably, with its distal end providing a pressure-receiving annular surface facing the root of said groove;

said stator having fluid supply means communicating with said cylinder groove for applying fluid pressure to and between said piston flange pressure-receiving surface and said groove root for driving the piston flange and thereby said thrusting disk in opposition to its bias for releasing the disks to enable driving of said shaft and the rotor by the motor.

4. In a self-contained failsafe brake unit especially adapted for association with a heavy-duty motor which is operative to drive a shaft rotatably:

a rotor having means for corotatively connecting it with said shaft;

a stator having means for mounting it in a stationary position concentric with said rotor;

friction disk means in part corotative with said rotor and in part non-rotative with said stator;

means normally biasing said disk means into brake-setting frictional gripping engagement to hold the rotor and shaft non-rotatable with the stator;

means for releasing said biasing means from its brake-setting relation to said disk means to enable rotation of said rotor with said shaft by operation of the motor;

mounting means on respective opposite ends of the unit for selectively securing either end of the unit to a supporting structure;

said stator comprising a base member and a body member;

means securing said base member and body member together;

said base member providing one end of the unit and said body member providing the opposite end of the unit;

each of said base member and said body member having laterally projecting bolting means thereon; and means for centering the unit relative to structure to which either end of the unit is secured.

5. In a self-contained failsafe brake unit especially adapted for association with a heavy-duty motor which is operative to drive a shaft rotatably:

a rotor having means for corotatively connecting it with said shaft;

a stator having means for mounting it in a stationary position concentric with said rotor;

friction disk means in part corotative with said rotor and in part non-rotative with said stator;

means normally biasing said disk means into brake-setting frictional gripping engagement to hold the rotor and shaft non-rotatable with the stator;

means for releasing said biasing means from its brake-setting relation to said disk means to enable rotation of said rotor with said shaft by operation of the motor;

a centering ring;

respective interengageable concentricity surfaces on said centering ring and said stator; and means on said ring engageable with a supporting structure on which the stator may be mounted to hold the stator against eccentric displacement.

6. A brake unit to claim 5, said means on said ring comprising a concentric flange extension engageable with an edge defining a clearance opening in the supporting structure.

7. A brake unit according to claim 5, said means engageable with the supporting structure comprising a pair of respective oppositely extending flanges of differential diameter on said ring adapted for engagement with selectively differential diameter edges defining clearance openings in the supporting structure.

8. In a self-contained failsafe brake unit especially adapted for association with a heavy-duty motor which is operative to drive a shaft rotatably:

a rotor having means for corotatively connecting it with said shaft;

a stator having means for mounting it in a stationary position concentric with said rotor;

friction disk means in part corotative with said rotor and in part non-rotative with said stator;

means normally biasing said disk means into brake-setting frictional gripping engagement to hold the rotor and shaft non-rotatable with the stator;

means for releasing said biasing means from its brake-setting relation to said disk means to enable rotation of said rotor with said shaft by operation of the motor;

the stator having means for mounting it on a bulkhead having a clearance opening therethrough with which the brake unit is aligned; and a ring member assembled with said stator and cooperative with said means for mounting the stator and engageable with an edge defining the opening and with a complementary surface on the stator for holding the stator against eccentric displacement relative to the bulkhead.

9. In combination with a unit adapted to be operatively coupled concentrically with a shaft and having a housing including means for attaching it to a support having a clearance opening which may be of a selectively different diameter, a device comprising:

a centering ring having a pair of respective oppositely extending flanges of differential diameter adapted for engagement with selectively differential diameter edges defining clearance openings in the support; and an annular concentricity surface on said housing engageable with one of said flanges in any selected relationship of the ring with the edge of a clearance opening with which engaged in concentricity-maintaining relation.

10. In combination in a rotary hydraulic motor having a housing and a shaft which are relatively rotatable and a brake unit including its own housing and brake means therein corotatively coupled to the shaft and normally connecting the shaft and brake housing against relative rotation, and means for selectively releasing the brake means to enable relative rotation of the shaft and said housings, the improvement comprising:

flange means carried on said motor housing for mounting it on supporting structure;

and other flange means carried on said brake housing for mounting it on supporting structure in various selected operative axial alignment positions with relation to said motor housing.

11. A combination according to claim 10, including means for securing said mounting flange means together with the supporting structure therebetween.

12. A combination according to claim 10, including means for connecting said mounting flange means of said housings together with the motor mounted piggyback relative to the brake, and additional mounting means on said brake housing for mounting the brake housing on supporting structure.

13. A combination according to claim 10, including a member to be driven rotatably and having a shaft to be supported by and between spaced frame members, said mounting flange means of the motor housing being adapted to be secured to one of said frame members and said mounting flange means on the brake housing being adapted to be secured to the other of said frame members with both the motor shaft and said brake means being adapted to be coupled corotatively with said member shaft.

14. In a self-contained failsafe brake unit especially adapted for association with a heavy-duty motor which is operative to drive a shaft rotatably:

a rotor having a socket in one end receptive of a complementary end portion of the shaft;

means for keying the rotor corotatably to the shaft within said socket;

a stator having means for mounting it in a stationary position concentric with said rotor;

friction disk means in part corotative with said rotor and in part non-rotative with said stator;

means normally biasing said disk means into brake-setting frictional gripping engagement to hold the rotor and shaft non-rotatable with the stator;

means for releasing said biasing means from its brake-setting relation to said disk means to enable rotation of said rotor with said shaft by operation of the motor;

a shaft extension on said rotor by which working rotary motion generated by the motor is adapted to be transmitted to apparatus with which the motor and brake assembly are to be used;

said extension having a bore axially therein providing a bolt hole;

a bolt extending through said hole and axially threaded into the end of the shaft for releasably securing the rotor to the shaft end portion to retain them against axial separation;

said bolt having a head received a substantial distance into said bore; and a shoulder in said bore against which the bolt head is driven retainingly.

15. In a self-contained failsafe brake unit especially adapted for association with a heavy-duty motor which is operative to drive a shaft rotatably:

a rotor having means for corotatively connecting it with said shaft;

a stator having means for mounting it in a stationary position concentric with said rotor;

a stack of relatively axially adjustable interleaved frictionally confronting annular brake disks certain of which are coupled corotatively to said rotor and alternate ones of the disks being coupled non-rotatively to said stator;

means normally biasing said disks into brake-setting frictional gripping engagement with one another to hold the rotor and shaft non-rotatable with the stator;

said certain brake disks being metallic and said alternate brake disks being of friction material;

the stack of disks being arranged with a respective one of the friction material disks at each opposite end of the stack;

a shoulder element on said stator against which one of said endmost disks thrusts;

said biasing means comprising a pressure plate carried by said stator and thrusting against the opposite end disk;

said pressure plate having an annular margin extending radially outwardly beyond said stack of disks;

an annular piston flange on said margin and extending in the direction of thrust of the pressure plate;

said stator having a body member provided with a cylinder groove complementary to and within which said piston flange is engaged; and port means for application of pressure fluid in said cylinder groove to said piston flange and providing means for releasing said biasing means from its brake-setting relation to said disks to enable rotation of said rotor with said shaft by operation of the motor.

* * * * *